(No Model.)

L. WEINMAN.
PIPE CUTTER.

No. 430,552.   Patented June 17, 1890.

Witnesses:
E. P. Ellis,
J. M. Nesbit.

Inventor:
L. Weinman,
per J. A. Lehmann,
atty

UNITED STATES PATENT OFFICE.

LAWRENCE WEINMAN, OF COLUMBUS, OHIO.

PIPE-CUTTER.

SPECIFICATION forming part of Letters Patent No. 430,552, dated June 17, 1890.

Application filed March 31, 1890. Serial No. 346,058. (No model.)

*To all whom it may concern:*

Be it known that I, LAWRENCE WEINMAN, of Columbus, in the county of Franklin and State of Ohio, have invented certain new and useful Improvements in Pipe-Cutters; and I do hereby declare the following to be a full, clear, and exact description of the invention, such as will enable others skilled in the art to which it pertains to make and use it, reference being had to the accompanying drawings, which form part of this specification.

My invention relates to an improvement in pipe-cutters; and it consists in the combination of a flanged stationary sleeve or collar which is clamped to the pipe to prevent the other parts from moving endwise, a revolving wheel made in two parts and clamped around the pipe, but prevented from having an endwise movement by the flanged sleeve or collar, the two cutters applied to the wheel and made to bear against the pipe from opposite sides, and which rotate around the pipe with the wheel, a worm for revolving the wheel and the cutters, a frame in which the worm is journaled, and a leg or support applied to one end of this frame to prevent the frame from moving when the worm is operated, as will be more fully described hereinafter.

The object of my invention is to produce a pipe-cutter which can be applied directly to a pipe in the ground or in any other position, and by means of which the pipe can be cut squarely off or screwed up into position, as may be desired, the cutters being made to revolve around the pipe for the purpose of cutting it without the slightest danger of crushing or injuring it.

Figure 1:
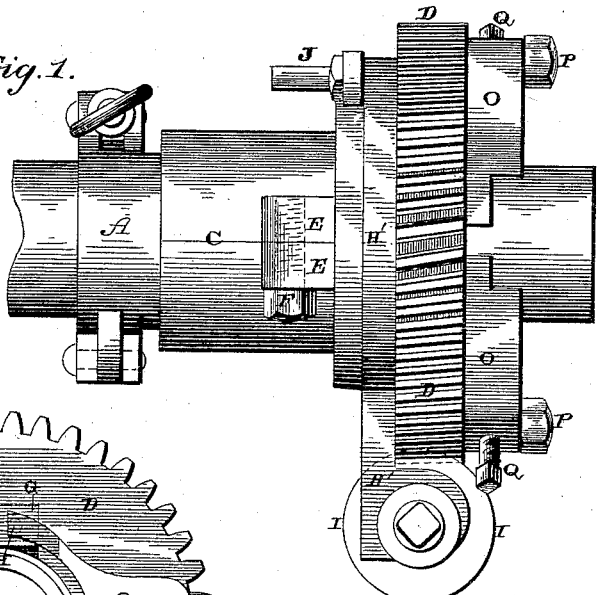
Figure 2:
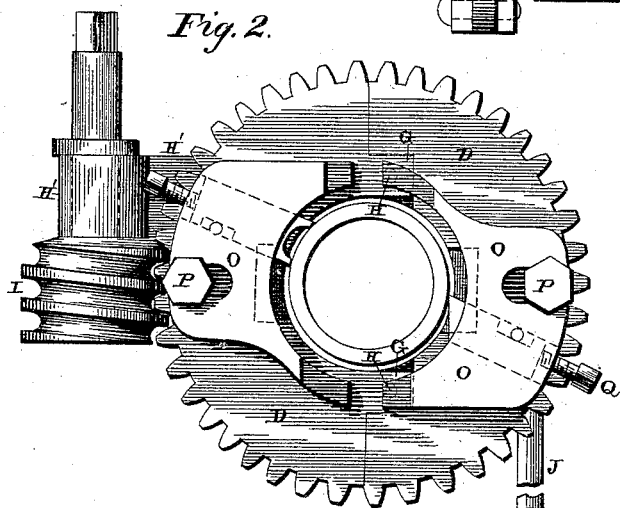
Figure 3:
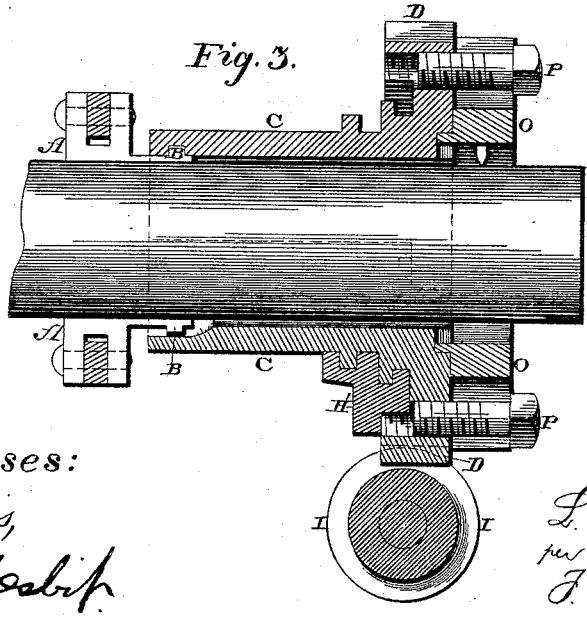

Figure 1 is a plan view of a pipe-cutter which embodies my invention. Fig. 2 is an end view of the same. Fig. 3 is a horizontal section.

A represents a sleeve or collar, which is made in two parts and coupled together, and which is securely clamped to the pipe by means of a thumb-screw for the purpose of preventing any endwise movement of the cutter while in operation. Upon the inner end of this sleeve or collar is formed a flange B, over which the grooved end of the sleeve C catches. This sleeve C forms a portion of the wheel D, which is formed of two parts and securely clamped together by means of the ears E and the clamping-bolts F. The outer end of this sleeve is made to catch over the collar A for the purpose of preventing the wheel from moving endwise upon the pipe. For the purpose of preventing the two parts of the wheel D from spreading, one part is provided with the projections G, from the inner sides of which extend the studs H, and the other portion of the wheel is provided with corresponding recesses to receive these projections and studs for the purpose of preventing the two portions of the wheel from spreading. These projections and studs are used in addition to the clamping-bolts for holding the two parts of the wheel together, so that the parts cannot possibly spread when great power is applied, as is necessary in cutting off heavy pipes. In the sleeve C, adjacent to the wheel D, are formed grooves, as shown, and in these grooves the frame H' is held, one end of the frame forming a bearing for the worm I, by which the wheel D is made to revolve, and the other end of the frame has a leg or support J connected thereto, in order to prevent this frame from revolving around the wheel when power is applied to the worm. The lower end of this leg or support rests against the ground or any suitable support, and prevents the frame from moving around the wheel in that direction. If no leg or support were used, the application of power to the worm would cause the frame to move around the wheel instead of causing the wheel to revolve around the pipe.

Applied to the outer side of the wheel D are the two cutter-holders O, which have projections formed at their inner edges to catch in corresponding recesses formed in the inner edges of the wheel, and which projections, in addition to the screws P, secure the frames rigidly to the wheel D. These frames have recesses formed in them to receive cutters to cut the pipes or jaws to grasp the pipe from opposite sides, so as to enable the pipes to be screwed up.

The cutters, being applied to opposite sides of the pipe and made to revolve around with the wheel, have no pressure applied to them, except that which is applied through the set-screws Q, and this pressure will never be sufficient to crush or injure the pipe in any respect. When it becomes necessary to screw the pipes up, nothing is necessary except to remove the cutters and substitute jaws for them.

Should it be desired or necessary to turn the worm in both directions, a leg or support J may be applied to each end of the frame.

Having thus described my invention, I claim—

1. The combination of a flanged collar, which is clamped to the pipe, a revolving wheel provided with an internally-grooved sleeve to catch over the flange on the collar, cutter-frames carrying cutters secured to the wheel, a frame swiveled upon the sleeve of the wheel, provided with a support for preventing it from turning, and a worm to which the power is applied and which engages with the wheel, substantially as shown.

2. The combination of a flanged collar, which is clamped to the pipe, the revolving wheel, provided with an internally-grooved sleeve, which catches over the flanged collar, a frame swiveled upon the sleeve of the wheel, a leg or support applied to one end of the frame, and a worm applied to the other, substantially as described.

In testimony whereof I affix my signature in presence of two witnesses.

LAWRENCE WEINMAN.

Witnesses:
E. P. ELLIS,
JOHN T. ARMS.